United States Patent [19]
Salzwedel

[11] 3,929,050
[45] Dec. 30, 1975

[54] REVERSIBLE HACK SAW BLADE
[76] Inventor: Arden L. Salzwedel, Rte. No. 1, Montello, Wis. 53949
[22] Filed: Aug. 1, 1974
[21] Appl. No.: 493,967

[52] U.S. Cl. .................................. 83/848; 30/355
[51] Int. Cl.² .................................. B23D 61/12
[58] Field of Search ............ 83/848, 849, 850, 835, 83/783–786; 30/355

[56] References Cited
UNITED STATES PATENTS

| | | | |
|---|---|---|---|
| 735,586 | 8/1903 | Rabie | 83/850 |
| 759,958 | 5/1904 | Batchelder | 83/849 |
| 1,882,328 | 10/1932 | Kinkel | 83/835 |
| R4,068 | 7/1870 | Davis et al. | 83/848 |

FOREIGN PATENTS OR APPLICATIONS

| | | | |
|---|---|---|---|
| 358,429 | 12/1905 | France | 83/848 |
| 80,287 | 5/1934 | Sweden | 83/848 |

*Primary Examiner*—Frank T. Yost
*Attorney, Agent, or Firm*—Keith Schoff

[57] ABSTRACT

A hack saw blade is provided in which the teeth along either half of the blade edge are disposed in oppositely facing directions to enable the blade to be reversibly mounted for operable use. The useful life of the blade is thereby extended when used to cut relatively narrow work pieces.

1 Claim, 1 Drawing Figure

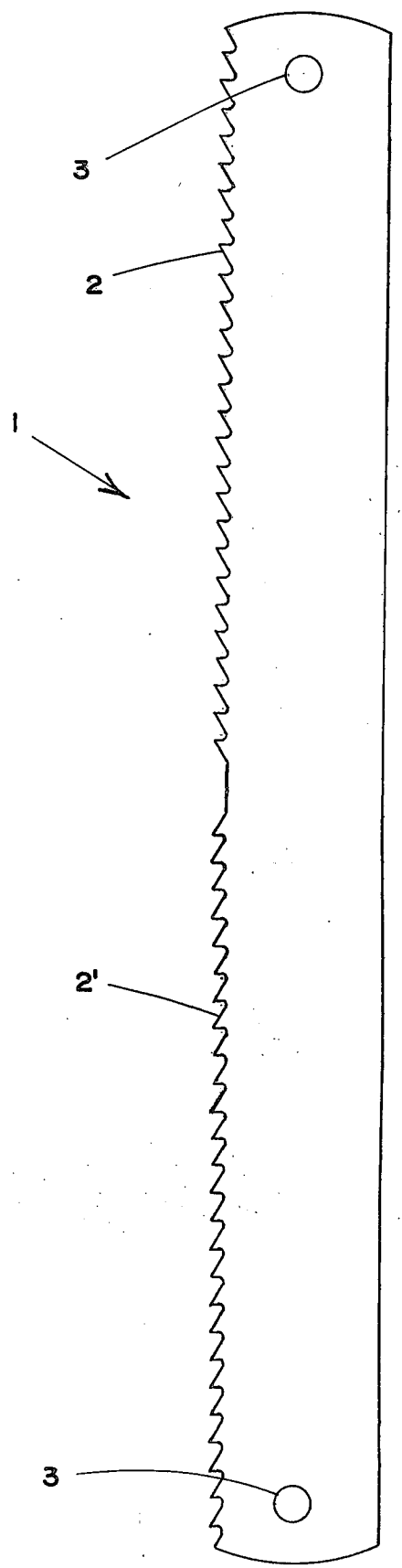

REVERSIBLE HACK SAW BLADE

BACKGROUND OF THE INVENTION

Power hack saws conventionally impart an oscilatory motion to a cutting blade wherein the blade is forcibly drawn over a work piece for several inches of stroke and is raised above the work on the return stroke. A 12 inch long saw blade might be provided with a 4 inch stroke so that for any work piece not over 2 inches wide, not more than on-half of the blade teeth contact the work piece. It is known to provide teeth on both edges of a hack saw blade and provide the blade with appropriate mounting holes for reversibly mounting the blade top-for-bottom, but it is not known to provide a blade which can be reversed end-for-end to provide operable cutting action.

SUMMARY OF THE INVENTION

A hack saw blade is provided with teeth along one-half of the blade edge disposed oppositely facing from the teeth along the remaining half of the edge providing thereby opposite cutting directions for the two halves of the blade. The useful blade life, for use with relatively narrow work stock, is twice that of a conventional single edge blade and is attained at no increase in costs of material, forming, heat-treating, packaging or shipping. In many applications where the principal use for which hack saws are employed is for cutting pipe, bar or rod stock, plate or other narrow stock in which only a minor portion of the blade teeth is utilized, use of the blade of this invention can reduce blade consumption by one-half. A work piece is secured near the fore-end of the blade at the beginning of the forward cutting stroke and the teeth on the forward half of the blade will be the only teeth to traverse the work piece. When those teeth are dull, the blade can be reverse mounted end-for-end in the blade holder and the remaining teeth positioned for use. If the work stock is of such width that more than one-half of the blade teeth traverse the work piece during the cutting stroke, the rearmost teeth will not provide cutting action, but will not interfere with the cutting operation or be damaged in use.

DRAWING

The FIGURE is an elevation of one embodiment of a hack saw blade of this invention.

DESCRIPTION OF THE INVENTION

Referring to the drawing, blade 1 comprises a hack saw blade of conventional size with mounting holes 3 provided each end extremity in customary manner. Teeth 2 and 2' are shown facing, respectively, oppositely toward either end of blade 1. Teeth 2 and 2' are conventional in size and shape and blade 1 can be used interchangeably with conventional blades, however, only on-half of the edge of blade 1 will provide cutting action in either of the two positions in which the blade may be operably mounted. When the upper end as shown of blade 1 is disposed foremost in the direction of the cutting stroke, only teeth 2 will provide cutting action, whereas if blade 1 is reverse mounted with the opposite end foremost, only teeth 2' will be operably positioned to cut. Thus, used, blade 1 provides twice the cutting capability and useful life of a conventional single edge blade because all teeth are effectively utilized rather than about half the teeth as is the usual case when cutting small to medium diameter work stock, that is, stock in which the stock dimension plus the blade stroke does not exceed the length of one-half the blade. When teeth are dulled by use, blade 1 is reversed end-for-end in its frame and the teeth on the other half of the blade are positioned for use. If stock of greater dimension is used, the trailing portion of the blade will traverse the work piece without providing cutting action, but without causing interference or damage.

While the drawing shows teeth 2 and 2' facing toward the ends of blade 1, it is possible to have the teeth face away from the near end of blade 1 and toward the opposite file of teeth. To use such a blade, the holder for the work piece will be centered approximately mid-blade when the blade starts its forward cutting stroke so that the trailing half of the blade will traverse the work piece, however, the arrangement shown in the drawing is the preferred embodiment of this invention and provides easier adaptability for a variety of work piece sizes.

Blade 1 provides twice as many usable teeth as conventional single edge saw blades while costing no more than a conventional blade, and costing less than a blade provided with teeth on two edges, when used with narrow work stock such as comprises the preponderant number of hack saw cutting applications, and thus provides a material savings and cost advantage over blades now in use.

I claim:

1. In a thin, elongated, narrow, toothed blade configured with apertures in near adjacency to the end extremities to provide for mounting in a frame, tensioning, stretching, and driving with reciprocal oscillation as a power hack saw to provide cutting action in one direction of motion, an improvement comprising in combination a first plurality of next adjacent teeth disposed in a file in one facing direction along one blade edge portion and second plurality of next adjacent teeth disposed in a file in opposite facing direction along another portion of said blade edge, wherein said portions are substantially equal in length and comprise substantially the entire blade edge, and wherein said files of teeth are aligned axially with each such tooth configured in substantial uniformity with all other teeth in such file, thereby to provide operable cutting reversibility to said blade.

* * * * *